(12) United States Patent
Xiong et al.

(10) Patent No.: US 11,228,169 B1
(45) Date of Patent: Jan. 18, 2022

(54) COMBINED HIGH AND LOW VOLTAGE PROTECTION CIRCUIT FOR HALF-BRIDGE CONVERTER

(71) Applicant: Universal Lighting Technologies, Inc., Madison, AL (US)

(72) Inventors: Wei Xiong, Madison, AL (US); Danny Pugh, Harvest, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 14 days.

(21) Appl. No.: 16/929,759

(22) Filed: Jul. 15, 2020

Related U.S. Application Data

(60) Provisional application No. 62/896,646, filed on Sep. 6, 2019.

(51) Int. Cl.
*H02H 7/12* (2006.01)
*H02M 1/08* (2006.01)
*H02M 1/36* (2007.01)
*H02H 1/00* (2006.01)
*H02H 3/20* (2006.01)

(52) U.S. Cl.
CPC ........ *H02H 7/1213* (2013.01); *H02H 1/0007* (2013.01); *H02M 1/08* (2013.01); *H02M 1/36* (2013.01); *H02H 3/20* (2013.01); *H02H 3/202* (2013.01); *H02H 3/207* (2013.01)

(58) Field of Classification Search
CPC ..... H02H 7/1231; H02H 1/0007; H02M 1/08; H02M 1/36; H02M 3/20; H02M 3/202; H02M 3/207
USPC .......................................................... 361/90
See application file for complete search history.

(56) References Cited

U.S. PATENT DOCUMENTS

| 5,739,645 | A | 4/1998 | Xia et al. |
| 6,154,375 | A | 11/2000 | Majid et al. |
| 7,626,343 | B2 * | 12/2009 | Ger .................... H05B 41/2853 315/119 |
| 8,115,405 | B2 | 2/2012 | Yamahara et al. |
| 9,755,422 | B2 * | 9/2017 | Lin .......................... H02H 7/09 |
| 9,913,346 | B1 * | 3/2018 | Xiong .................... H05B 47/24 |

(Continued)

OTHER PUBLICATIONS

PIC18F8722 Family Data Sheet, Microchip, 2008.
Microchip Core Independent Peripherals for 8-bit PIC Microcontrollers Nov. 29, 2011.

*Primary Examiner* — Yemane Mehari
(74) *Attorney, Agent, or Firm* — Patterson Intellectual Property Law, P.C.; Gary L. Montle

(57) ABSTRACT

A power converter and method for providing surge protection to the power converter is provided herein. An over voltage protection portion of a protection circuit is coupled between the rail voltage and ground reference of the power converter, and senses a first magnitude of the rail voltage. An under voltage protection portion of the protection circuit is coupled to a controller of the power converter and further between the rail voltage and the ground reference, and senses a second magnitude of the rail voltage to be transmitted to the controller. A regulator block is coupled between the over voltage protection portion and the under voltage protection portion, and is configured to compare the first magnitude of the rail voltage to a reference voltage of the regulator block, and to short circuit the under voltage protection portion when the first magnitude of the rail voltage is greater than the reference voltage.

20 Claims, 4 Drawing Sheets

(56) References Cited

U.S. PATENT DOCUMENTS

| | | | |
|---|---|---|---|
| 2001/0021092 A1* | 9/2001 | Astala | H02J 7/0029 |
| | | | 361/90 |
| 2005/0190516 A1* | 9/2005 | Lee | H01L 27/0251 |
| | | | 361/90 |
| 2006/0290388 A1 | 12/2006 | Tolle et al. | |
| 2007/0230228 A1 | 10/2007 | Mao | |
| 2007/0247084 A1 | 10/2007 | Zhao | |
| 2011/0204803 A1 | 8/2011 | Grotkowski et al. | |
| 2012/0223667 A1 | 9/2012 | Wang et al. | |
| 2012/0230059 A1 | 9/2012 | Adragna et al. | |
| 2012/0250360 A1 | 10/2012 | Orr et al. | |
| 2012/0262086 A1 | 10/2012 | Feldtkeller | |
| 2013/0063186 A1 | 3/2013 | Debeer et al. | |
| 2014/0070743 A1 | 3/2014 | Yoshida et al. | |
| 2014/0111089 A1 | 4/2014 | Guleria et al. | |
| 2018/0175735 A1 | 6/2018 | Zhao et al. | |
| 2018/0287601 A1 | 10/2018 | Yang et al. | |
| 2019/0260199 A1* | 8/2019 | Turcan | H02H 3/207 |

\* cited by examiner

COMBINED HIGH AND LOW VOLTAGE PROTECTION CIRCUIT FOR HALF-BRIDGE CONVERTER

CROSS-REFERENCES TO RELATED APPLICATIONS

This application claims benefit under 35 USC. § 119(e) of U.S. Provisional Patent Application No. 62/896,646, filed Sep. 6, 2019, entitled "Combined High and Low Voltage Protection Circuit for Half-Bridge Converter," and the entirety of which is incorporated by reference herein.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

FIELD OF THE INVENTION

The present disclosure relates generally to surge protection systems and methods. More particularly, the present disclosure relates to providing high and low voltage protection to a power converter.

BACKGROUND

Electronic power supplies, also known as power converters, are vulnerable to high voltage surges caused, for example, by lightning strikes. One defense to high voltage surges caused by lightning strikes is to provide outdoor surge protection. One standard for outdoor surge protection is the ability to withstand a 6 kV, 2000 A surge from a combination wave generator.

Two-stage half-bridge type power converters or inverters are used widely in power supply design. When a high voltage surge appears across the line and neutral of the input Vac of a power supply with a half-bridge type inverter/converter, even with a surge protector connected in parallel with the input Vac to limit the voltage to the rest of the circuit, a high voltage is presented across capacitor C1 and the rail voltage (shown in FIG. 1).

A typical power supply with a half-bridge type inverter/converter may include an integrated circuit (IC) or controller for driving switching elements Q1 and Q2 which form a half-bridge DC-DC converter. The output of the half-bridge DC-DC converter may be connected to a load (or power tank). The IC may include a half-bridge connection pin HB connected to the output of the half-bridge DC-DC converter for monitoring said output.

Without any further surge protection, semiconductor components, particularly the IC 130, as well as the switching elements Q1 and Q2, may be damaged by a surge. For example, if the rail voltage is around 480 volts DC, a 600 volt-rated switch Q1, a 600 volt-rated switch Q2, and a 600 volt-rated IC will be used. The switching elements Q1 and Q2 are power devices and thus have a greater capacity to handle larger voltage spikes greater than 600 volts. The IC, however, is rated for an absolute maximum of 600 volts. As the first switching element Q1 switches on and off, the half-bridge connection pin HB is effectively connected to the rail voltage V_rail periodically. If the rail voltage exceeds 600 volts during a surge condition, the IC may be easily damaged and cause failure of the entire circuit or system. There is a similar concern that the switching elements Q1 and Q2 will be easily damaged during such a surge condition and cause failure of the entire circuit or system.

BRIEF SUMMARY

Accordingly, a need exists in the art is a fast triggering surge protection circuit in a power supply whose AC input is already connected to an existing surge protection means to provide protection for the integrated circuit (IC) thereof and its associated switching components.

In an embodiment, a protection circuit as disclosed herein comprises an over voltage protection portion coupled between the rail voltage and a ground reference of the power converter, and configured to sense a first magnitude of the rail voltage. An under voltage protection portion is coupled between the rail voltage and the ground reference, the under voltage protection portion further coupled to the controller and configured to sense a second magnitude of the rail voltage to be transmitted to the controller. A regulator block is coupled between the over voltage protection portion and the under voltage protection portion, and further configured to compare the first magnitude of the rail voltage to a reference voltage of the regulator block, and to short circuit the under voltage protection portion when the first magnitude of the rail voltage is greater than the reference voltage.

In one exemplary aspect of the above-referenced embodiment, the first magnitude of the rail voltage, when equal to the reference voltage, may correspond to a high rail voltage threshold of the controller.

In another exemplary aspect of the above-referenced embodiment, the second magnitude of the rail voltage may be forced toward zero when the first magnitude of the rail voltage is greater than the reference voltage.

In another exemplary aspect of the above-referenced embodiment, the second magnitude of the rail voltage may be independent of the regulator block when the first magnitude of the rail voltage is less than the reference voltage.

In another exemplary aspect of the above-referenced embodiment, the regulator block may include a first input coupled to the over voltage protection portion, a second input coupled to the under voltage protection portion, and an output adapted for coupling to a ground reference of the power converter.

In another exemplary aspect of the above-referenced embodiment, the regulator block may include a bipolar transistor coupled between the second input and the output of the regulator block.

In another exemplary aspect of the above-referenced embodiment, the regulator block may include an impedance defined between the second input and the output of the regulator block. In such a configuration, the impedance may be high when the first magnitude of the rail voltage is less than the reference voltage, and the impedance may be low when the first magnitude of the rail voltage is greater than the reference voltage.

In another exemplary aspect of the above-referenced embodiment, the over voltage protection portion may include at least two resistors coupled in series and configured to define the first magnitude of the rail voltage there between when coupled to the power converter.

In another exemplary aspect of the above-referenced embodiment, the under voltage protection portion may include at least two resistors coupled in series and configured to define the second magnitude of the rail voltage there between when coupled to the power converter.

In another embodiment as disclosed herein, a power converter may be provided with a protection circuit having integrated over voltage and under voltage functionality in accordance with one or more of the above-referenced embodiments and exemplary aspects.

In another embodiment as disclosed herein, a protection circuit having integrated over voltage and under voltage functionality in accordance with one or more of the above-referenced embodiments and exemplary aspects may be modular in nature and adapted for selective coupling with each of a rail bus, ground reference bus, and controller of the power converter.

In another embodiment as disclosed herein, a method of operation may include inter alia coupling of a protection circuit with each of a rail bus, ground reference bus, and controller of a power converter, wherein the protection circuit has integrated over voltage and under voltage functionality in accordance with one or more of the above-referenced embodiments and exemplary aspects.

DETAILED DESCRIPTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

The following detailed description of embodiments of the present disclosure refers to one or more drawings. Each drawing is provided by way of explanation of the present disclosure and is not a limitation. Those skilled in the art will understand that various modifications and variations can be made to the teachings of the present disclosure without departing from the scope of the disclosure. For instance, features illustrated or described as part of one embodiment can be used with another embodiment to yield a still further embodiment.

The present disclosure is intended to cover such modifications and variations as come within the scope of the appended claims and their equivalents. Other objects, features, and aspects of the present disclosure are disclosed in the following detailed description. One of ordinary skill in the art will understand that the present discussion is a description of exemplary embodiments only and is not intended as limiting the broader aspects of the present disclosure.

Figure 1:
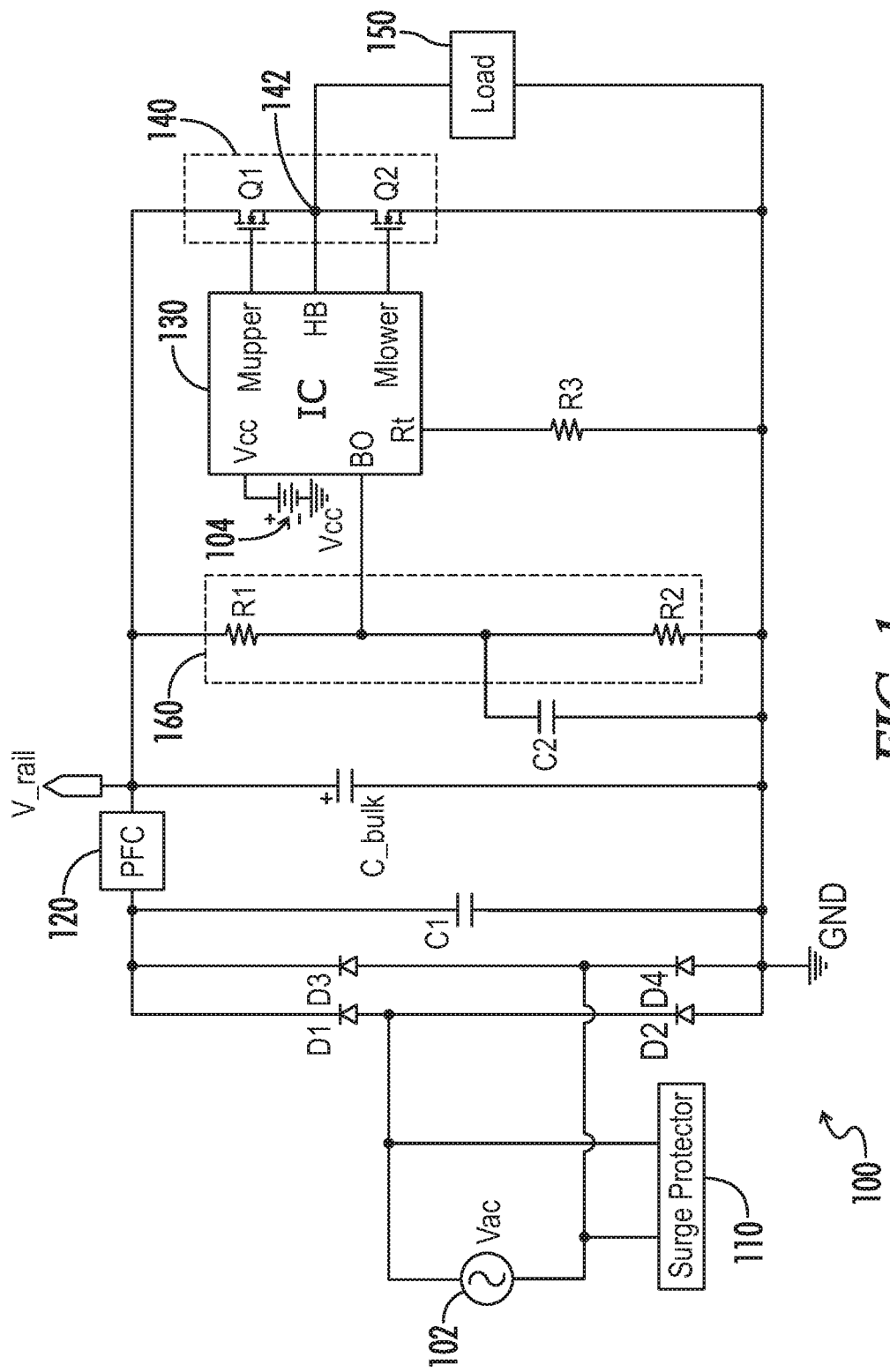
FIG. 1 is a circuit diagram representing a power converter (e.g., a half-bridge resonant type DC-DC converter) as disclosed herein.

FIG. 1 illustrates a power converter 100 with a half-bridge type inverter/converter having a surge protector 110. The surge protector 110 may be, for example, a metal oxide varistor (MOV), and may be connected in parallel with the input Vac 102 to limit the voltage to the rest of the circuit. The power converter may also be referred to herein as a power supply 100.

Diodes D1-D4 together form an input rectification circuit that converts the AC input voltage to a DC rail voltage V_rail. The DC rail voltage V_rail may also be referred to herein as a rail voltage V_rail or a voltage rail V_rail. Capacitor C1 is a high frequency filter capacitor. A power factor correction (PFC) stage 120 is coupled between the input and the second stage half-bridge DC-DC converter. The PFC stage 120 regulates the input current to achieve a high power factor, as well as to stabilize the rail voltage (V_rail) to the second stage half-bridge DC-DC converter.

Switching elements Q1 and Q2 form a half-bridge DC-DC converter 140 in FIG. 1. The half-bridge DC-DC converter 140 may also be referred to herein as a half-bridge 140. Switching elements Q1 and Q2 may also be referred to herein as switches Q1 and Q2, as first and second switching elements Q1 and Q2, or as first and second switches Q1 and Q2. Switching elements Q1 and Q2 may take the form of any type of switching device, such as a MOSFET, a BJT, an IGBT, or the like. The integrated circuit (IC) 130 may be a half-bridge drive IC and may be used to drive the switching elements Q1 and Q2 (via drive signals) at a certain operating frequency. The IC 130 may also be referred to herein as a controller 130. The voltage Vcc 104 represents the power supply input of the IC 130. A load 150 is connected to the output 142 of the half-bridge DC-DC converter (e.g., between the switching elements Q1 and Q2). The load 150 may be any type of load, such as a resonant tank, an inductive load, a capacitive load, or a resistive load.

The IC 130 may include a power supply pin Vcc, a timing resistor pin Rt, a brown-out protection pin BO, a high-side driver output pin M_upper, a low-side driver output pin M_lower, and a half-bridge connection pin HB. The high-side and low-side driver output pins M_upper, M_lower may be used to drive the gates of the switching elements Q1 and Q2. The power supply pin Vcc may be connected to the voltage Vcc 104 for powering the IC 130. The timing resistor pin Rt may set the operating frequency of high-side and low-side driver output pins M_upper, M_lower. The half-bridge connection pin HB may be connected to the output 142 of half-bridge (e.g., between the switching elements Q1 and Q2) for monitoring the operating frequency. The brown-out protection pin BO protects the IC 130, as well as the switching elements Q1 and Q2, by shutting down the drive signals from the IC 130 to the switching elements Q1 and Q2 when the voltage at the brown-out protection pin BO is less than 1 volt (i.e., a brown-out reference voltage) or greater than 2 volts and by turning on (or resuming operation) of the IC 130 when the voltage at the brown-out protection pin BO is between 1 volt and 2 volts. In certain optional embodiments, the IC 130 may, for example, be a NCP1392B self-oscillating half-bridge driver IC manufactured by ON Semiconductor Comp any.

Resistors R1 and R2 form a voltage divider circuit 160 used to sense the rail voltage V_rail in FIG. 1. The voltage across resistor R2 (e.g., a magnitude of the rail voltage V_rail) may be fed back to the brown-out protection pin BO of the IC 130 for "brown-out" protection.

When a high voltage surge appears across the line and neutral of the input Vac 102, even with the surge protector 110, an unavoidable high voltage is presented across capacitor C1 and the rail voltage V_rail.

As previously mentioned, without any further protection, semiconductor components, particularly the half-bridge connection pin HB of the IC 130, as well as potentially the switching elements Q1 and Q2, may be damaged by a surge. For example, if the target rail voltage V_rail is around 480 volts DC, then a 600 volt-rated switching element Q1, a 600 volt-rated switching element Q2, and a 600 volt-rated IC 130 may be select. The switching elements Q1 and Q2 are power devices and thus have a good capacity to handle larger voltage spikes (e.g., over 600 volts). The IC 130, however, is rated for an absolute maximum of 600 volts. As the first switching element Q1 switches on and off due to drive signals from the IC 130 at the high-side driver output pin M_upper, the half-bridge connection pin HB is effectively connected to the rail voltage V_rail periodically. Accordingly, the weakest point of the power converter 100 of FIG. 1 may be the half-bridge connection pin HB of the IC 130.

If the rail voltage V_rail exceeds 600 volts during a surge condition, the IC 130 may be easily damaged via the half-bridge connection pin HB and cause failure of the entire circuit or system. There is a similar concern that the switching elements Q1 and Q2 will be easily damaged during such a surge condition and cause failure of the entire circuit or system.

One way to protect the IC 130 from getting damaged from a high rail voltage V_rail, typically associated with a surge occurrence, is to turn off the switching elements Q1 and Q2 when the rail voltage is high, for example, around 600 volts, in order to isolate the IC 130 from the rail voltage V_rail.

The present disclosure uses the brown-out protection pin BO of the IC 130 to shut down the gate drive signals of the IC 130, for example, when the rail voltage V_rail is less than a predetermined low threshold voltage and when the rail voltage V_rail is greater than a predetermined high threshold voltage. The rail voltage V_rail being greater than a predetermined high threshold voltage may be associated with a surge.

The issue with using the brown-out protection pin BO of the IC 130 in such a manner is that the brown-out protection pin BO of the IC 130 has a wide working range (e.g., from 1 volt to 2 volts). As a result, designing a 'simple' circuit (e.g., the voltage divider circuit 160 shown in FIG. 1) for surge protection around the brown-out protection pin BO is not practical. One reason is that the brown-out protection pin BO of the IC 130 was originally designed for "brown-out" (or under voltage) protection, which means that when the rail voltage V_rail reaches a certain low level (e.g., drops below the predetermined low threshold voltage), the IC 130 will shut down the gate drive signals to the switching elements Q1 and Q2.

When designing a circuit for surge protection around the brown-out protection pin BO, the following requirement may necessarily be observed, namely, the rail voltage V_rail has to reach a certain level (e.g., the a predetermined low threshold voltage) to start the half-bridge DC-DC converter 140 safely without drawing too much current from the bulk capacitor C_bulk. Using the voltage divider circuit 160 of FIG. 1 for example, in order to start the half-bridge at a certain starting rail voltage level V_rail_start (e.g., the a predetermined low threshold voltage), the values of resistors R1 and R2 of the voltage divider circuit 160 may satisfy:

$$\frac{R2}{R1+R2} \times \text{V\_rail\_start} > 1 \text{ volt} \qquad (1)$$

If the starting rail voltage level V_rail_start is designated at 408 volts (e.g., 85% of 480 volts, an example normal voltage of the bulk capacitor C_bulk in steady state) for starting the half-bridge, then the 2 volt shutdown voltage at the brown-out protection pin BO will occur at 2 times the starting rail voltage level V_rail_start (or 816 volts), which is too high for the circuit components to handle. As a result, the predetermined high threshold voltage threshold for shutting down the gate drive signals to the switching elements Q1 and Q2 is practically useless for high voltage (or surge) protection.

In FIG. 1, for example, if the 2 volt shutdown voltage at the brown-out protection pin BO is designated to correspond with the rail voltage V_rail equaling 580 volts (e.g., an example of a predetermined high threshold voltage), which is less than 600 volts, then the IC 130 will shut down the gate drive signals to the switching elements Q1 and Q2 for protecting the IC according to the following:

$$\frac{R2}{R1+R2} \times 580 = 2 \text{ volt} \qquad (2)$$

The issue, however, is that the startup rail voltage level V_rail_start will be equal to 290 volts when the voltage at the brown-out protection pin BO is equal to 1 volt, according to equation (2). This startup rail voltage level V_rail_start is too low and too early for the IC 130 to start driving the switching elements Q1 and Q2. Practically, it is good to start the half-bridge 140 (e.g., the gate drive signals to the switching elements Q1 and Q2) when the rail voltage V_rail reaches at least 85% (or some other predetermined percentage) of its target operating value in order to protect the switching elements Q1 and Q2 from over-current damage. For example, and as previously mentioned, if the target value of the rail voltage V_rail is 480 volts, then 85% of the target value is equal to 408 volts.

In order to use the brown-out protection pin BO of the IC 130 to shut down the gate drive during a surge condition (e.g., when the rail voltage V_rail is greater than the predetermined high threshold voltage), the design of a brown-out pin surge protection circuit may separate under voltage protection circuitry from over voltage protection circuitry.

Figure 2:
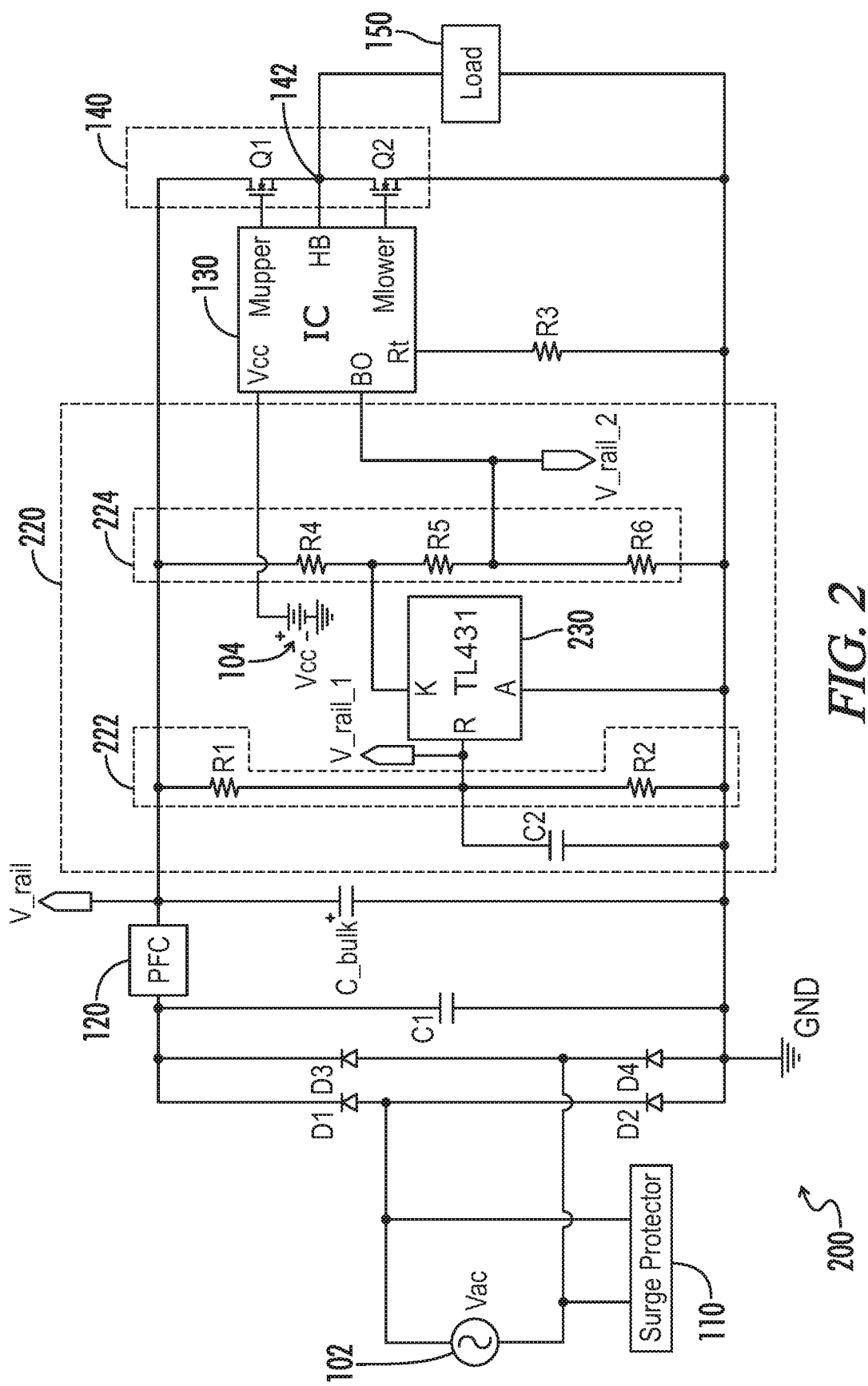
FIG. 2 is a circuit diagram representing an improved power converter (e.g., a half-bridge resonant type DC-DC converter) including a high and low voltage protection circuit as disclosed herein.

Referring to FIG. 2, an improved power converter 200 having an integrated high and low voltage protection circuit 220 is shown. The integrated high and low voltage protection circuit 220 may also be referred to herein as a hi-lo voltage protection circuit 220 or a brown-out voltage protection circuit 220. The hi-lo voltage protection circuit 220 separates under voltage protection circuitry from over voltage protection circuitry. The improved power converter 200 of FIG. 2 is similar to the previously described power converter 100 of FIG. 1 and as such like elements are numbered the same as FIG. 1.

The hi-lo voltage protection circuit 220 is configured to sense the rail voltage V_rail and use the brown-out protection pin BO of the IC 130 to shut down the gate drive signals of the IC 130 at the high-side and low-side driver output pins M_upper and M_lower when the rail voltage V_rail is less than the starting rail voltage level V_rail_start and when the rail voltage V_rail is greater than a high rail voltage threshold V_rail_high (e.g., the predetermined high threshold voltage). The hi-lo voltage protection circuit 220 may include an over voltage protection portion 222, an under voltage protection portion 224, and a regulator block 230 coupled between the over voltage protection portion 222 and the under voltage protection portion 224. The regulator block 230 may also be referred to herein as a regulator 230.

Figure 3A:
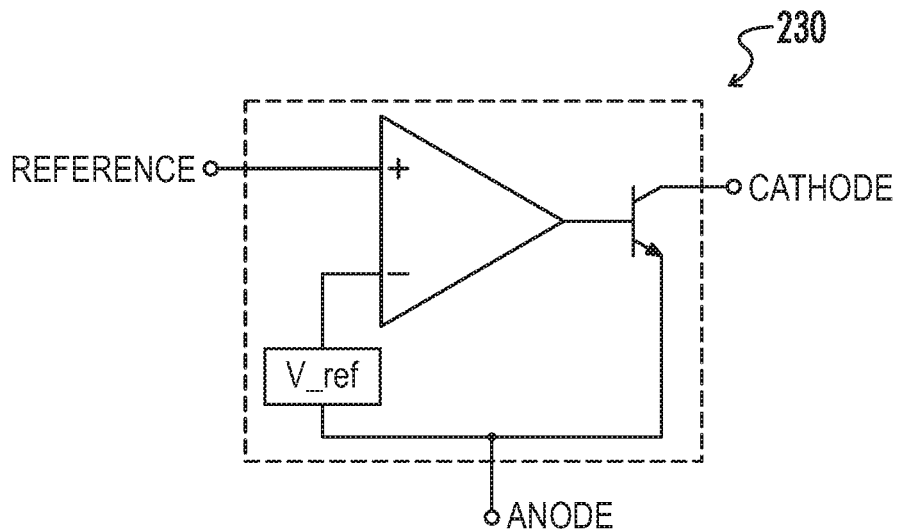
FIG. 3A is circuit diagram of a first embodiment of a regulator of the high and low voltage protection circuit of FIG. 2.
Figure 3B:
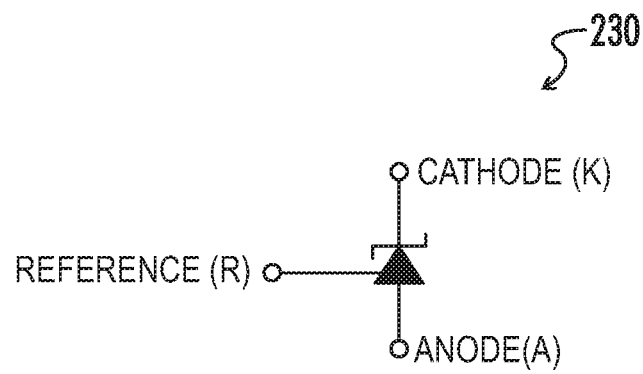
FIG. 3B is circuit diagram of a second embodiment of a regulator of the high and low voltage protection circuit of FIG. 2

Referring to FIGS. 3A and 3B, additional details of an optional embodiment of the regulator block 230 are shown. The regulator block 230 may include a reference voltage V_ref which is used to help accurately sensing the rail voltage V_rail. The regulator block 230 may further include a reference connection point (R), a cathode connection point (K), and an anode connection point (A). The anode connection point (A) may be coupled to a ground reference GND of the improved power converter 200. The regulator block 230 may, for example, be a shunt regulator such as a TL431 (e.g., model KA431 from Fairchild Company). The TL431 is one example of an applicable regulator that is a low-cost device and that can provide an accurate reference voltage V_ref (e.g., 2.5 volts).

The over voltage protection portion 222 of the hi-lo voltage protection circuit 220 may be coupled between the rail voltage V_rail and the ground reference GND. The over voltage protection portion 222 may be a voltage divider and may include a first resistor R1 and a second resistor R2 for sensing the rail voltage V_rail. The node between the first resistor R1 and the second resistor R2 may be coupled to the reference connection point (R) of the regulator block 230. The voltage (e.g., a first magnitude V_rail_1 of the rail voltage V_rail) across the second resistor R2 is compared with the reference voltage V_ref. The first magnitude V_rail_1 may also be referred to herein as a over voltage magnitude V_rail_1 of the rail voltage V_rail. Capacitor C2 may be coupled in parallel with the second resistor R2 for filtering out any high frequency noise at the reference connection point (R). When the voltage across R2 is less than the reference voltage V_ref, which may for example be 2.5 volts in the case of the TL431 in FIGS. 3A and 3B, the impedance between the cathode connection point (K) and the anode connection point (A) will be very high. For example, the impedance between the cathode connection point (K) and the anode connection point (A), when the voltage across R2 is less than the reference voltage V_ref, may be equivalent to that of or comparable to an open circuit.

As such, when the rail voltage V_rail is low, such that the voltage across R2 is less than the reference voltage V_ref, the regulator block 230 is effectively out of the hi-lo voltage protection circuit 220. Accordingly, only the under voltage protection portion 224 of the hi-lo voltage protection circuit 220 will provide rail voltage V_rail information to the brown-out protection pin BO of the IC 130 (e.g., the under voltage protection portion 224 will be independent during said conditions).

The under voltage protection portion 224 of the hi-lo voltage protection circuit 220 may be coupled between the rail voltage V_rail and the ground reference GND. The under voltage protection portion 224 may further be coupled between the regulator block 230 and the IC 130. The under voltage protection portion 224 may be a voltage divider and may include at least two resistors. As illustrated in FIG. 2, the under voltage protection portion 224 includes three resistors, namely, a fourth resistor R4, a fifth resistor R5, and a sixth resistor R6. As such, only the fourth resistor R4, the fifth resistor R5, and the sixth resistor R6 will provide rail voltage V_rail information to the brown-out protection pin BO of the IC 130 when the voltage across R2 is less than the reference voltage V_ref. A node defined between the fourth resistor R4 and the fifth resistor R5 may be coupled to the cathode connection point (K). Further, a node defined between the fifth resistor R5 and the sixth resistor R6 may be coupled to the brown-out protection pin BO of the IC 130. Accordingly, the voltage (e.g., a second magnitude V_rail_2 of the rail voltage V_rail) across the sixth resistor R6 is received at and/or sensed by the brown-out protection pin BO. The second magnitude V_rail_2 may also be referred to herein as a under voltage magnitude V_rail_2 of the rail voltage V_rail.

For the gate drive signals of the IC 130 to begin at 85% of the rail voltage V_rail, the resistance values of the fourth resistor R4, the fifth resistor R5, and the sixth resistor R6 may satisfy:

$$\frac{R6}{R4 + R5 + R6} \times Vrail \times 0.85 = 1 \text{ volt} \qquad (3)$$

If equation (3) is satisfied, then the IC 130 will start transmitting gate drive signals to the half-bridge 140 at 85% of the target value of the rail voltage V_rail.

When a surge happens, the large current will flow into the bulk capacitor C_bulk and cause a sharp rail voltage V_rail increase. To protect the IC 130, the IC 130 may terminate transmission of gate drive signals and shutdown the switching elements Q1 and Q2 at the high rail voltage threshold V_rail_high (e.g., 580 volts which is less than the 600 volts maximum IC rated voltage), and remain shut down until the rail voltage V_rail decreases below the high rail voltage threshold V_rail_high. As such, the hi-lo voltage protection circuit 220 provides an auto-recovery feature following a surge.

The resistance values of the first resistor R1 and the second resistor R2 may satisfy:

$$\frac{R2}{R1 + R2} \times V\_rail\_high = 2.5 \text{ volt} \qquad (4)$$

As soon as the voltage (e.g., a first magnitude of the rail voltage V_rail) across the second resistor R2 reaches the reference voltage V_ref (or 2.5 volts in the case of the TL431), a bipolar transistor defined between the cathode connection point (K) and the anode connection point (A) will turn on and short circuit the pathway between the cathode connection point (K) and the anode connection point (A) according to the control logic shown in FIG. 3A. When the pathway between the cathode connection point (K) and the anode connection point (A) is shorted, the voltage across the sixth resistor R6 will be about zero, which is less than the 1 volt brown-out protection threshold (e.g., a brown-out reference voltage V_ref_bo) of the IC 130. As a result, the IC 130 will stop transmitting the gate drive signal to the half-bridge 140 and the switching elements Q1 and Q2 will be turned off, immediately, and remain off as long as the rail voltage V_rail is greater than the high rail voltage threshold V_rail_high (e.g., the predetermined high threshold voltage).

When the switching elements Q1 and Q2 are off, the half-bridge connection pin HB of the IC 130 will be isolated from the rail voltage V_rail so that even if the rail voltage V_rail continues to increase the half-bridge connection pin HB will remain safe based on the off state high impedance offered by the switching elements Q1 and Q2. Additionally, the voltage across the switching elements Q1 and Q2, when the switching elements Q1 and Q2 are off, is half of the rail voltage V_rail, which is much less than their rated maximum voltages. As such, the switching elements Q1 and Q2 will also be safe when the rail voltage V_rail is greater than the high rail voltage threshold V_rail_high (e.g., the predetermined high threshold voltage).

Turning off the switching elements Q1 and Q2 when the rail voltage V_rail reaches the high rail voltage threshold V_rail_high (e.g., 580 volts) offers strong protection for the switching elements Q1 and Q2, as well as the IC 130, thus guaranteeing that the second stage of the improved power converter 200 survives an input surge transient condition.

When the regulator block 230 (e.g., TL431) turns on its output bipolar transistor, all or substantially all of the current through the fourth resistor R4 will flow into the cathode connection point (K) of the regulator block 230. When the regulator block 230 comprises, for example, the TL431, a recommended operating condition thereof is that the minimum cathode current may be, for example, at least 1 mA, which may help define the resistance value of the fourth resistor R4 as follows:

$$\frac{Vrail}{R4} > 1 \text{ mA} \qquad (5)$$

After an input surge transient condition, the rail voltage V_rail will slowly go back to its normal voltage controlled by the PFC stage 120. When the rail voltage V_rail decreases to less that the high rail voltage threshold V_rail_high, the regulator block 230 (e.g., TL431) will turn off its output bipolar transistor and the fourth resistor R4, the fifth resistor R5, and the sixth resistor R6 will resume sensing the rail voltage V_rail and the IC 130 will automatically restart the gate drive of the switching elements Q1 and Q2.

The hi-lo voltage protection circuit 220 may help circuits, such as the power converter 100 shown in FIG. 1 survive an input surge transient condition and dramatically improve reliability.

Figure 4:
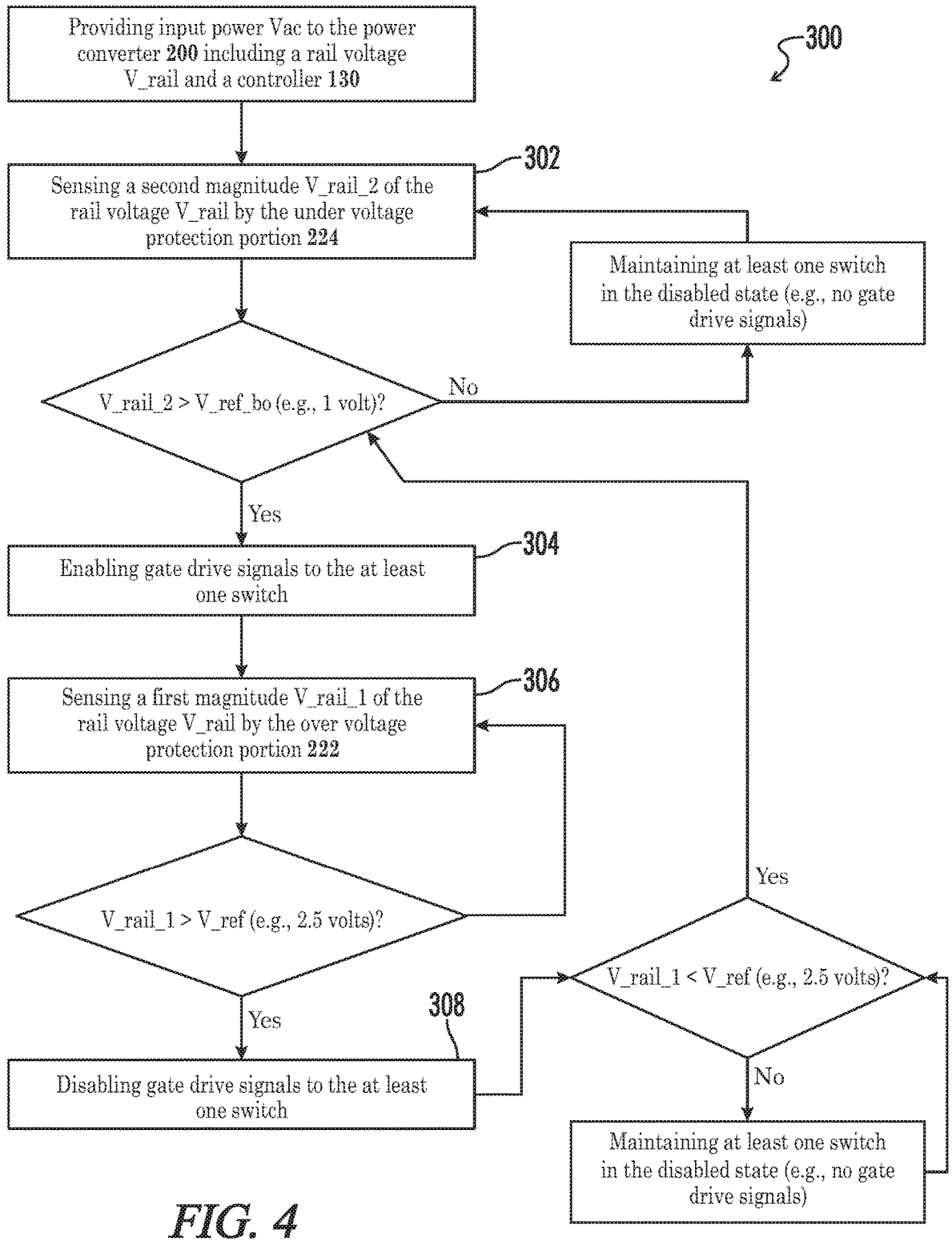
FIG. 4 a flow chart for a method of providing surge protection by the high and low voltage protection circuit of FIG. 2 to the power converter of FIG. 2.

Referring to FIG. 4, a flowchart corresponding to a method of implementing the functionality of the hi-lo voltage protection circuit 220 is shown. A method 300 of providing surge protection by a hi-lo voltage protection circuit 220 for a power converter 200 including a rail voltage V_rail and an IC 130 configured to drive at least one switch (e.g., the switching elements Q1 and Q2) based at least in part upon the rail voltage V_rail. The method 300 may include sensing 302 a second voltage magnitude V_rail_2 of the rail voltage V_rail using the under voltage protection portion 224. The method 300 may further include enabling 304 gate drive signals to the at least one switch when the sensed second voltage magnitude V_rail_2 is greater than a brown-out reference voltage V_ref_bo of the IC 130. The method 300 may include sensing 306 a first voltage magnitude V_rail_1 of the rail voltage V_rail by the over voltage protection portion 222. The method 300 may further include disabling 308 gate drive signals to the at least one switch when the sensed first voltage magnitude V_rail_1 is greater than a reference voltage V_ref of the regulator block 230.

The method 300 may further include selecting resistors (e.g., resistance values for resistors R4, R5, and R6) of a voltage divider of the under voltage protection portion 224 such that the second voltage magnitude V_rail_2 of the rail voltage V_rail, when equal to the brown-out reference voltage V_ref_bo of the IC 130, corresponds to a startup rail voltage V_rail_start for the IC 130.

The method 300 may further include short circuiting at least a portion of the under voltage protection portion 224 to force the second voltage magnitude V_rail_2 to be less than the brown-out reference voltage V_ref_bo.

The method 300 may further include selecting resistors (e.g., resistance values for resistors R1 and R2) of a voltage divider of the over voltage protection portion 222 such that the first voltage magnitude V_rail_1 of the rail voltage V_rail, when equal to the reference voltage V_ref of the regulator block 230, corresponds to a high threshold voltage V_rail_high for the IC 130.

The method 300 may further include enabling gate drive signals to the at least one switch (e.g., the switching elements Q1 and Q2) once the sensed first voltage magnitude V_rail_1 drops below reference voltage V_ref of the regulator block 230.

The method 300 may further include disabling gate drive signals to the at least one switch when the sensed second voltage magnitude V_rail_2 is less than the brown-out reference voltage V_ref_bo of the IC 130.

The method 300 may further include isolating the IC 130 from a rail voltage V_rail higher than a high threshold voltage V_rail_high for the IC 130 to thereby protect the IC 130 from damage To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims. The phrase "in one embodiment," as used herein does not necessarily refer to the same embodiment, although it may.

The term "circuit" means at least either a single component or a multiplicity of components, either active and/or passive, that are coupled together to provide a desired function. Terms such as "wire," "wiring," "line," "signal," "conductor," and "bus" may be used to refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A protection circuit for providing integrated under voltage protection and over voltage protection from a rail voltage of a power converter, the power converter comprising a controller for driving at least one switching element thereof, the protection circuit comprising:
    an over voltage protection portion coupled between the rail voltage and a ground reference of the power converter, and configured to sense a first magnitude of the rail voltage;
    an under voltage protection portion coupled between the rail voltage and the ground reference, the under voltage protection portion further coupled to the controller and configured to sense a second magnitude of the rail voltage to be transmitted to the controller; and
    a regulator block coupled between the over voltage protection portion and the under voltage protection portion, the regulator block configured to
        compare the first magnitude of the rail voltage to a reference voltage of the regulator block, and
        short circuit the under voltage protection portion when the first magnitude of the rail voltage is greater than the reference voltage.

2. The protection circuit of claim 1, wherein:
the first magnitude of the rail voltage, when equal to the reference voltage, corresponds to a high rail voltage threshold of the controller.

3. The protection circuit of claim 1, wherein:
the second magnitude of the rail voltage is forced toward zero when the first magnitude of the rail voltage is greater than the reference voltage.

4. The protection circuit of claim 1, wherein:
the second magnitude of the rail voltage is independent of the regulator block when the first magnitude of the rail voltage is less than the reference voltage.

5. The protection circuit of claim 1, wherein:
the regulator block includes a first input coupled to the over voltage protection portion, a second input coupled to the under voltage protection portion, and an output coupleable to a ground reference of the power converter.

6. The protection circuit of claim 5, wherein:
the regulator block includes a bipolar transistor coupled between the second input and the output of the regulator block.

7. The protection circuit of claim 5, wherein:
the regulator block includes an impedance defined between the second input and the output of the regulator block;
the impedance is high when the first magnitude of the rail voltage is less than the reference voltage; and
the impedance is low when the first magnitude of the rail voltage is greater than the reference voltage.

8. The protection circuit of claim 1, wherein:
the over voltage protection portion includes at least two resistors coupled in series and configured to define the first magnitude of the rail voltage therebetween when coupled to the power converter.

9. The protection circuit of claim 1, wherein:
the under voltage protection portion includes at least two resistors coupled in series and configured to define the second magnitude of the rail voltage therebetween when coupled to the power converter.

10. A power converter comprising:
first and second switching elements coupled in series between a rail voltage and a ground reference;
a controller configured to generate gate drive signals to the switching elements, wherein an output from the switching elements corresponds to a frequency of the gate drive signals, the controller including a brown-out pin configured to disable the gate drive signals when a sensed voltage at the brown-out pin is less than a brown-out reference voltage of the controller; and
a hi-lo voltage protection circuit coupled between the rail voltage and the ground reference, and further coupled to the brown-out pin of the controller, the hi-lo voltage protection circuit configured to provide the sensed voltage at the brown-out pin, wherein the sensed voltage is greater than the brown-out reference voltage when the rail voltage is between a target startup rail voltage and a high rail voltage threshold associated with the controller.

11. The power converter of claim 10, wherein:
the hi-lo voltage protection circuit includes an over voltage protection portion, an under voltage protection portion, and a regulator coupled between the over voltage protection portion and the under voltage protection portion;
each of the over voltage protection portion and the under voltage protection portion are coupled between the rail voltage and the ground reference; and
the under voltage protection portion is configured to generate the sensed voltage.

12. The power converter of claim 11, wherein:
the over voltage protection portion includes a first resistor and a second resistor;
the regulator includes a reference voltage;
the first and second resistors are selected such that a voltage across the second resistor will equal the reference voltage when the rail voltage is equal to the high rail voltage threshold; and
the regulator will force the sensed voltage to be less than the brown-out reference voltage when the rail voltage is greater than the high rail voltage threshold.

13. The power converter of claim 11, wherein:
the under voltage protection portion includes at least two resistors for generating the sensed voltage.

14. A method of providing surge protection for a power converter including a controller configured to drive at least one switch based at least in part upon a rail voltage, the power converter further including a protection circuit including an over voltage protection portion, an under voltage protection portion, and a regulator positioned there between, the method comprising:
    coupling an over voltage portion of the protection circuit between the rail voltage and a ground reference of the power converter, and coupling an under voltage portion of the protection circuit to the controller and further between the rail voltage and the ground reference, wherein a regulator is positioned there between;
    sensing an under voltage magnitude of the rail voltage by the under voltage protection portion;
    enabling gate drive signals to the at least one switch when the sensed under voltage magnitude is greater than a brown-out reference voltage of the controller;
    sensing an over voltage magnitude of the rail voltage by the over voltage protection portion; and
    disabling gate drive signals to the at least one switch when the sensed over voltage magnitude is greater than a reference voltage of the regulator.

15. The method of claim 14, further comprising:
selecting resistors of a voltage divider of the under voltage protection portion such that the under voltage magnitude of the rail voltage, when equal to the brown-out reference voltage of the controller, corresponds to a startup rail voltage for the controller.

16. The method of claim 14, further comprising:
short circuiting at least a portion of the under voltage protection portion to force the under voltage magnitude to be less than the brown-out reference voltage.

17. The method of claim 14, further comprising:
selecting resistors of a voltage divider of the over voltage protection portion such that the over voltage magnitude of the rail voltage, when equal to the reference voltage of the regulator, corresponds to a high threshold voltage for the controller.

18. The method of claim 14, further comprising:
enabling the at least one switch once the sensed over voltage magnitude drops below reference voltage of the regulator.

19. The method of claim 14, further comprising:
disabling gate drive signals to the at least one switch when the sensed under voltage magnitude is less than the brown-out reference voltage of the controller.

20. The method of claim 14, further comprising:
isolating the controller from a rail voltage higher than a high threshold voltage for the controller to thereby protect the controller from damage.

* * * * *